Nov. 7, 1933.  J. KALVIN  1,933,557
EDIBLE PREPARING MACHINE
Filed Sept. 15, 1930
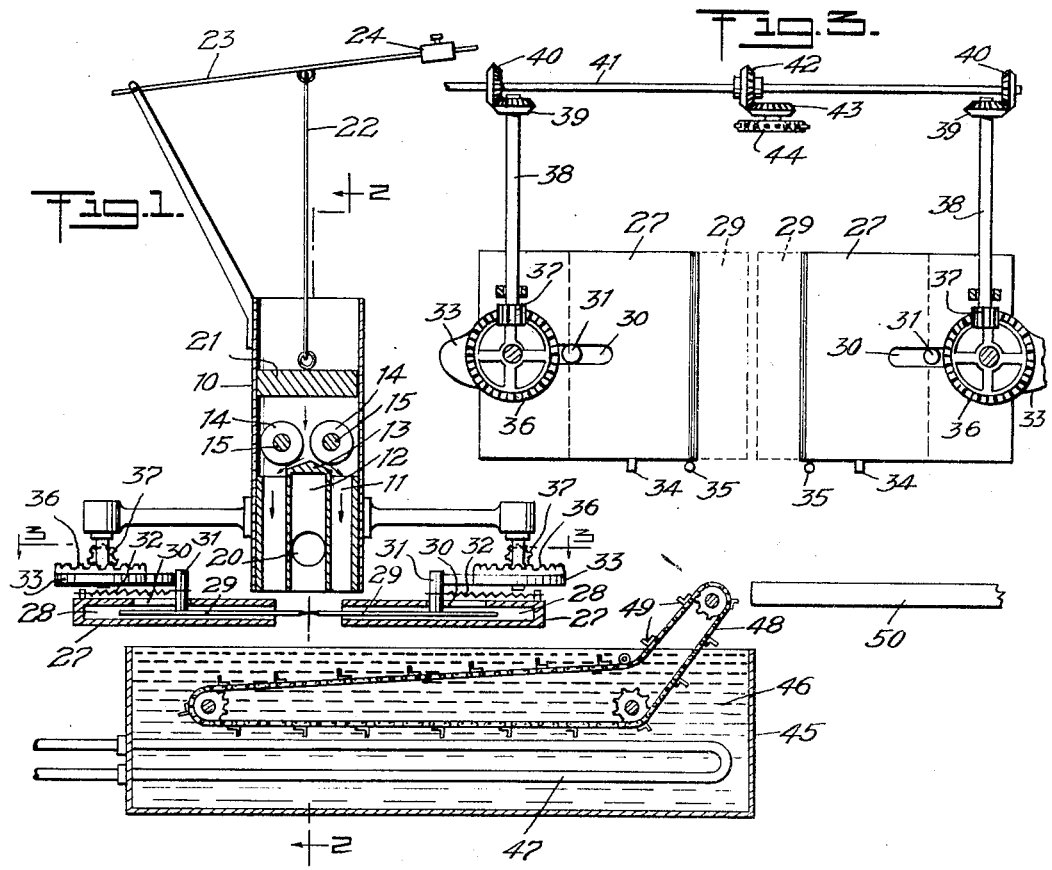
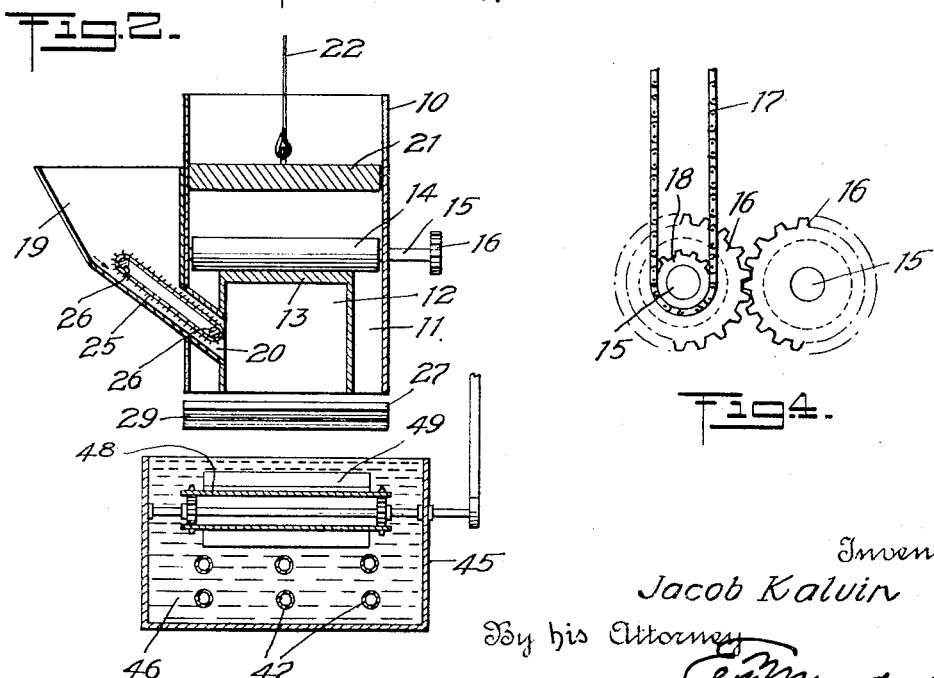
Inventor
Jacob Kalvin
By his Attorney Patented Nov. 7, 1933

1,933,557

UNITED STATES PATENT OFFICE 1,933,557

EDIBLE PREPARING MACHINE

Jacob Kalvin, New York, N. Y.

Application September 15, 1930
Serial No. 482,020

1 Claim. (Cl. 107—1)

This invention relates to edible preparing machines, and more particularly to such machines for preparing an edible having an outer enclosure and a filler.

Among the principal objects which the present invention has in view are: To provide a machine which will automatically and completely make an edible of such character; to obtain a continuous flow of materials; to pinch the enclosure material together intermittently; to obtain a timed cooking of the edible and an automatic removal from the cooking medium; to secure simplicity of construction and operation; and to obtain other advantages and results as may be brought out in the following description.

In the drawing:

Figure 1 is a vertical sectional view and embodying the several features of the invention;

Figure 2 is a sectional view shown as taken on the line 2—2 of Figure 1;

Figure 3 is a plan of the pinching and cutting mechanism, shown as taken on the line 3—3 of Figure 1; and Figure 4 is an enlarged detail view of the driving gears for rotating the rollers.

In the specification:

In the specific embodiment of the invention illustrated in said drawing, the reference numeral 10 indicates a container for receiving and feeding the raw dough or other material of which the edible is to be made. This container is here shown as having an upper portion which is substantially rectangular and a lower which is subdivided to form a peripheral enclosure chamber 11 and a central filler supplying chamber 12, both of said chambers being vertically disposed and downwardly open. The enclosure forming chamber is furthermore upwardly open in communication with the upper portion of the container, but the filler supplying chamber is preferably closed at its top so as not to be in communication with said upper portion of the container and prevent the contents thereof from entering said chamber. This closure for the upper end of the filler supplying chamber is designated by numeral 13, and it is to be observed that said closure also provides an upwardly facing surface which cooperates with a pair of rollers 14, 14 thereabove for forcing the material in the upper chamber downwardly and outward into the peripheral chamber 11. These rollers preferably rotate downwardly toward each other so as to carry the material therebetween. I have shown the same mounted on shafts 15, 15 which project through the wall of the container and carry intermeshing gears 16, 16. One of the shafts is actuated from a suitable source of power (not shown) by suitable means, such as a chain 17 and sprocket 18 as illustrated.

In conjunction with the apparatus above described for providing a sleeve-like formation of enclosure dough, there is provided a means for feeding a filler thereinto. As here shown, I provide a hopper 19 at one side of the said container 10, said hopper having a lower chute 20 which enters through the peripheral chamber 11 to the central chamber 12. Filler material introduced into this chute will therefore pass to the central chamber and thus be positioned within the sleeve-like enclosure of the edible material.

Suitable means are provided for feeding both the enclosure material and the filler material. The feed for the enclosure material comprises in addition to the feed rollers 14, 14, above described, a pressure plate 21 substantially the cross-sectional size of the container and adapted to act as a plunger to push the material continuously to the rollers. A link 22 may extend upward from this plate to a lever 23 by which the link can be raised and lowered. Addition of weights 24 to the lever will obtain an adjustment of the feed to obtain a proper flow of the enclosure material. As illustrative of the means for feeding the filler material, I have indicated a conveyor 25 mounted in the chute, the same having a lower reach between rollers 26, 26, which is actuated downwardly toward the lower end of the chute. The conveyor belt may be roughened or provided with suitable spurs for obtaining a grip on the material for actuating purposes. By these, or other suitable means, I may therefore regulate the flow of both materials and obtain a resultant product of desired thickness of enclosure and with desired amount of filler therein.

It is a feature of the present invention to form from this sleeve-like or tubular ribbon of material with its filler, individual comestibles having a completely enclosing outer portion with a filler therein. To obtain such a comestible, I periodically pinch the outer material together, and sever it, at the place where thus pinched. It will be noted, that in pinching the material in this way that the upper end of one comestible is closed and the lower end of the next one is likewise closed. Therefore, after the machine has once gone into operation, each comestible has the lower end closed, and when it is severed at its upper end from the ribbon, the upper end is also closed, thereby obtaining a complete closure with the filler therein.

As one means of pinching and severing the material, I have shown a pair of slidable members 27, 27, oppositely disposed and slidable toward and away from each other in substantially a common plane at right angles to the direction of extrusion of the ribbon of material. These members are preferably arranged to perform the double function of pinching and then cutting the ribbon of material periodically, and in furtherance of that purpose are each shown as comprising a sheath 28 containing a knife or blade 29. The blade is arranged to remain retracted within the sheath and the sheath moved initially toward the edible material, whereby the blunt end of the sheath will pinch the material toward the other sheath which is similarly actuated. Upon completion of this initial movement of the sheath, the blade is projected therefrom to meet the similarly projected blade from the other sheath thereby affecting a complete severance of the material at the point where pinched together.

As illustrative of a means for obtaining this desired movement of sheath and blade, the upper side of the sheath is shown slotted as at 30, in the direction of movement of the sheath and blade. A pin 31 fast with respect to the knife projects upwardly through the slot thereby limiting movement of the blade with respect to the sheath. A spring 32 is provided to normally retract the blade into the sheath. The spring may conveniently be positioned at the upper side of the sheath with one end hooked on said pin and its other end anchored to the rear part of the sheath. The spring is of a character to exert greater tension than necessary to pinch the material. Above the sheath and spring is a horizontally disposed cam 33 adapted to contact with said pin 31 and move the pin laterally as the cam rotates. Because of the spring tension, pushing on the pin causes the whole member, that is, the sheath and blade to move simultaneously, and for convenience this will be termed the pinching movement of the member. A projection 34 is provided on the sheath which comes into contact with a fixed stop 35 thereby terminating said pinching movement of the member. Thereafter continued displacing action of the cam on the pin will obtain a relative movement between the sheath and blade overcoming tension of the spring stretching the same and projecting the blade.

Operation of the members 27, 27, is in timed or synchronized relationship to each other so the knives approach each other simultaneously and may also retract at one time. Preferably operation of said members 27, 27 also in timed or periodic relation to the feeding of the dough so as to obtain comestibles of the desired size and all uniform whether the machine be operated slowly or with greater rapidity. As here depicted, each cam 33 is fast with respect to a gear 36 in turn driven by a pinion 37 on a shaft 38, there being a separate pinion and shaft for each of said gears. Each shaft is provided in the disclosure with a bevel gear 39 each meshing respectively with bevel gears 40, 40 on a common drive shaft 41. This drive shaft may have a bevel gear 42 thereon in mesh with another bevel gear 43 fast with respect to a sprocket 44, and it is from this sprocket that the chain 17 and sprocket 18 are operated for the turning of feed rollers 14, 14.

As the comestible is severed from the ribbon of dough, it falls into a pan or vat 45 containing hot fat, or the like 46, and is cooked thereby. I have shown this fat heated by a submerged steam pipe 47. Cooking of the comestible is preferably limited to a definite period, and for that puropse I have shown a conveyor 48 submerged in the fat with suitable flights 49 projecting upwardly from the upper reach of the conveyor so as to positively carry the comestible along. The conveyor rises out of the vat at the advanced end of the upper reach so as to discharge the comestibles onto a table or receiving device 50.

I claim:

A machine as characterized comprising a container of substantially rectangular shape, said container having an opening at its top for receiving an edible, and an opening at its bottom for discharging the edible, a plurality of rollers substantially engaging the walls of the container and spaced apart so as to provide a bottom for the edible receiving portion of the chamber through which the edible may be passed and by which said edible will be evenly distributed, a supply chamber closed at its top and open at its bottom within said container and below the rollers for shaping the edible into a hollow centrally cored formation, an inclined hopper secured to the outside of and passing through the container to an opening in the supply chamber, a conveyor in said hopper for transporting a continuous flow of filler to within the supply chamber, said filler passing out through the bottom of said chamber and between the cored formation of the edible, a pair of cam operated knives directly below the container and supply chamber and substantially the same size of the bottom opening of said container, and means connected to said knives for intermittently opening and closing the knives for both cutting and squeezing the edible so as to provide a unit of edible completely enclosing the filler ready to be cooked.

JACOB KALVIN.